United States Patent
Li et al.

(10) Patent No.: US 9,730,205 B2
(45) Date of Patent: Aug. 8, 2017

(54) MULTI-CARRIER MODULATION WITH HIERARCHICAL RESOURCE ALLOCATION

(71) Applicant: Neocific, Inc., Bellevue, WA (US)

(72) Inventors: Xiaodong Li, Bellevue, WA (US); Titus Lo, Bellevue, WA (US)

(73) Assignee: Neocific, Inc., Bellevue, WA (US)

( * ) Notice: Subject to any disclaimer, the term of this patent is extended or adjusted under 35 U.S.C. 154(b) by 0 days.

(21) Appl. No.: 14/714,928

(22) Filed: May 18, 2015

(65) Prior Publication Data

US 2015/0257136 A1    Sep. 10, 2015

Related U.S. Application Data

(63) Continuation of application No. 13/416,690, filed on Mar. 9, 2012, now Pat. No. 9,036,573.

(51) Int. Cl.
| | |
|---|---|
| *H04W 4/00* | (2009.01) |
| *H04W 72/04* | (2009.01) |
| *H04L 5/00* | (2006.01) |
| *H04L 1/00* | (2006.01) |
| *H04W 16/32* | (2009.01) |

(Continued)

(52) U.S. Cl.
CPC ............ *H04W 72/042* (2013.01); *H04L 1/00* (2013.01); *H04L 5/0046* (2013.01); *H04L 5/0048* (2013.01); *H04L 5/0053* (2013.01); *H04L 27/2601* (2013.01); *H04W 16/32* (2013.01); *H04W 72/0453* (2013.01); *H04L 5/0091* (2013.01); *H04L 5/1469* (2013.01); *H04W 16/24* (2013.01)

(58) Field of Classification Search
None
See application file for complete search history.

(56) References Cited

U.S. PATENT DOCUMENTS

| | | |
|---|---|---|
| 8,503,348 B2 | 8/2013 | Kim et al. |
| 8,526,342 B2 | 9/2013 | Esteves et al. |

(Continued)

OTHER PUBLICATIONS

International Patent Application No. PCT/US13/29657: International Search Report and Written Opinion dated May 21, 2013, 17 pages.

(Continued)

*Primary Examiner* — Phirin Sam
(74) *Attorney, Agent, or Firm* — Baker & Hostetler LLP

(57) ABSTRACT

Methods and systems for communicating in a multi-carrier communication system are disclosed. Radio resources may be organized in at least three hierarchical levels. The hierarchical levels may comprise macroblocks, blocks, and radio resource elements. A macroblock may contain a plurality of blocks and a block may contain a plurality of radio resource elements. The radio resource elements may further correspond to subcarriers in an orthogonal frequency division multiplexing (OFDM) symbol. An index in a control message may specify a modulation and/or coding scheme (MCS) pattern indicting a MCS for each block within a macroblock. In an embodiment, fewer bits are used by the index to specify a MCS pattern that is used statistically more frequently, and more bits are used by the index to specify a MCS pattern that is used statistically less frequently. Signals may be transmitted over the plurality of macroblocks.

23 Claims, 16 Drawing Sheets

(51) Int. Cl.
*H04L 27/26* (2006.01)
*H04L 5/14* (2006.01)
*H04W 16/24* (2009.01)

(56) References Cited

U.S. PATENT DOCUMENTS

| | | | |
|---|---|---|---|
| 8,705,399 B2 | 4/2014 | Lo et al. | |
| 2002/0102987 A1 | 8/2002 | Souisse et al. | |
| 2006/0262860 A1 | 11/2006 | Chou et al. | |
| 2009/0069023 A1 | 3/2009 | Ahn et al. | |
| 2009/0204863 A1* | 8/2009 | Kim | H04L 1/0004 714/748 |
| 2009/0209264 A1 | 8/2009 | Yang et al. | |
| 2009/0257388 A1 | 10/2009 | Khandekar et al. | |
| 2010/0061447 A1* | 3/2010 | Tu | H04N 21/23438 375/240.03 |
| 2010/0067367 A1 | 3/2010 | Choi et al. | |
| 2010/0195614 A1* | 8/2010 | Nimbalker | H04W 72/1289 370/330 |
| 2010/0220683 A1 | 9/2010 | Novak et al. | |
| 2010/0239015 A1* | 9/2010 | Wang | H04N 19/197 375/240.16 |
| 2010/0278132 A1 | 11/2010 | Palanki et al. | |
| 2011/0225417 A1 | 9/2011 | Maharajh et al. | |
| 2011/0267951 A1* | 11/2011 | Stanwood | H04L 41/5022 370/235 |
| 2012/0269115 A1* | 10/2012 | Esteves | H04L 5/0053 370/328 |
| 2013/0010661 A1 | 1/2013 | Esteves et al. | |
| 2013/0121186 A1* | 5/2013 | Vajapeyam | H04W 72/085 370/252 |
| 2013/0250855 A1 | 9/2013 | Bhattad et al. | |
| 2014/0226575 A1 | 8/2014 | Davydov et al. | |
| 2014/0254509 A1* | 9/2014 | Chen et al. | 370/329 |
| 2014/0328328 A1 | 11/2014 | Lindoff et al. | |
| 2015/0124901 A1* | 5/2015 | Xu et al. | 375/267 |
| 2016/0014840 A1* | 1/2016 | Kimmich | H04L 1/0003 370/329 |

OTHER PUBLICATIONS

Johansson, "On Scheduling and Adaptive Modulation with Limited Channel Feedback", http://signserv.teknikum.uu.se/Staff/mj/pub/MJTComm20040405.pdf, Apr. 5, 2004, 26 pages.

* cited by examiner

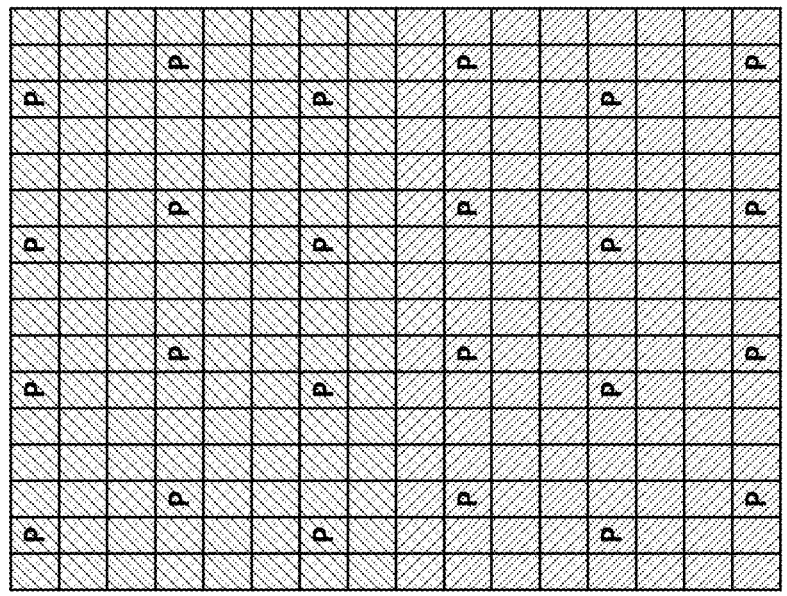
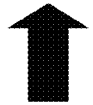
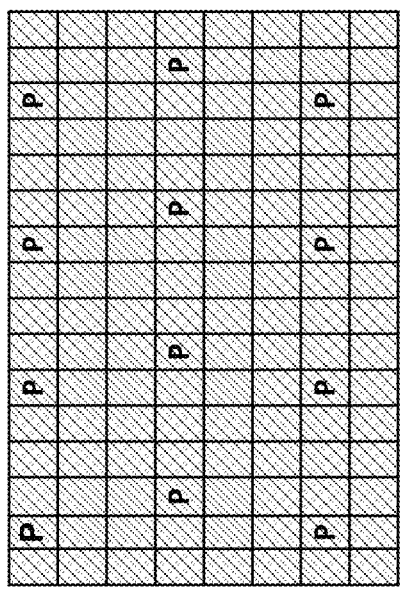
FIG. 11

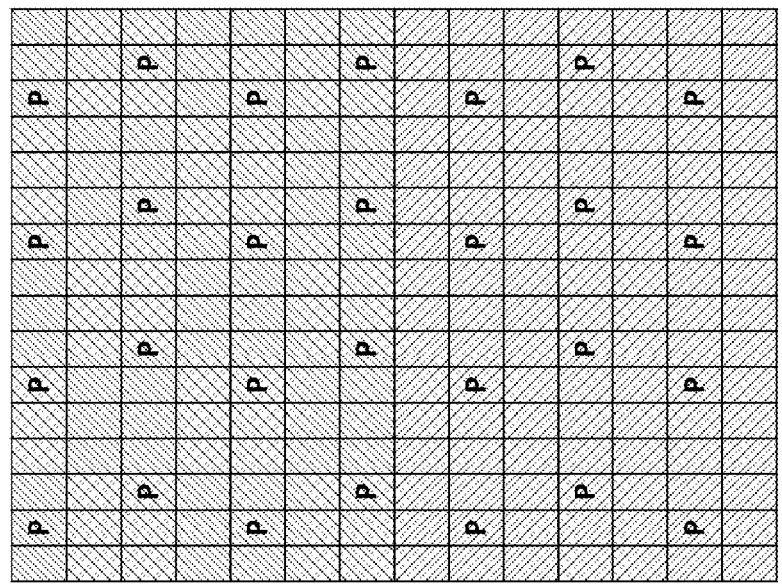
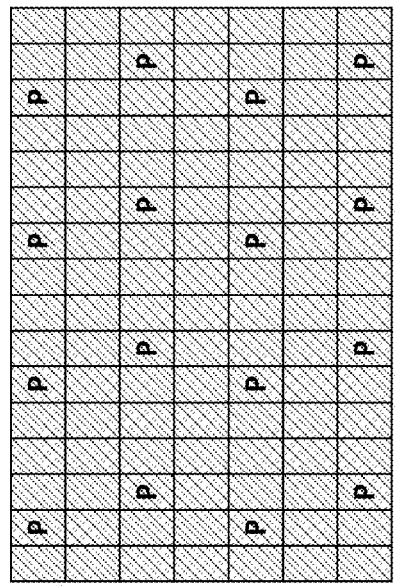
FIG. 12

MULTI-CARRIER MODULATION WITH HIERARCHICAL RESOURCE ALLOCATION

CROSS REFERENCE TO RELATED APPLICATIONS

This application is a continuation of U.S. patent application Ser. No. 13/416,690, filed Mar. 9, 2012, now U.S. Pat. No. 9,036,573, issued on May 19, 2015, the entire contents of which are incorporated herein.

TECHNICAL FIELD

The disclosed embodiments relate, in general, to wireless or wire-line communications and include methods and apparatus for multi-carrier modulation with hierarchical resource allocation.

BACKGROUND

As the demand for mobile services increases, so do the bandwidths in wireless systems. For example, for each generation of mobile communication systems, the operation bandwidth is significantly broader than that in the previous generation. In a wireless communication system, a channel is divided into multiple subchannels or resource blocks in time, frequency, code, or space. Subchannels are used as a basic link unit for the purpose of multiple access. One or more subchannels are assigned to a mobile user for voice, data, and multi-media services. The system must have the management functionalities to assign subchannels and schedule transmissions. As the operation bandwidth increases, so does the number of subchannels, which in turn leads to exponential increase in radio resource overhead for control signaling required by channel assignment and transmission scheduling and for facilitating system functions such as channel estimation, modulation, and coding. Thus, this is a real need for effective organization or allocation of radio resources in order to reduce the overhead in a future generation of mobile communication systems.

SUMMARY

In accordance with various embodiments of the present invention, methods and systems for communicating in a multi-carrier communication system are disclosed. The methods and systems may be implemented by base stations or mobile stations operating in the multi-carrier communication system. In an embodiment, radio resources may be organized in at least three hierarchical levels. The hierarchical levels may comprise macroblocks, blocks, and radio resource elements. A macroblock may contain a plurality of blocks and a block may contain a plurality of radio resource elements. The radio resource elements may further correspond to subcarriers in an orthogonal frequency division multiplexing (OFDM) symbol. An index in a control message may specify a modulation and/or coding scheme (MCS) pattern indicting a MCS for each block within a macroblock. In an embodiment, fewer bits are used by the index to specify a MCS pattern that is used statistically more frequently, and more bits are used by the index to specify a MCS pattern that is used statistically less frequently. Signals may be transmitted over the plurality of macroblocks.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The present invention will be thoroughly understood from the detailed description given below and from the accompanying drawings of various embodiments of the invention, which, however, should not be taken to limit the invention to the specific embodiments, but are for explanation and understanding only.

FIG. 11 is a graphical depiction of an embodiment of concatenating two subchannels in time to form a macroblock.

FIG. 12 is a graphical depiction of another embodiment of concatenating two subchannels in time to form a macroblock.

DETAILED DESCRIPTION OF ILLUSTRATIVE EMBODIMENTS

Figure 1:
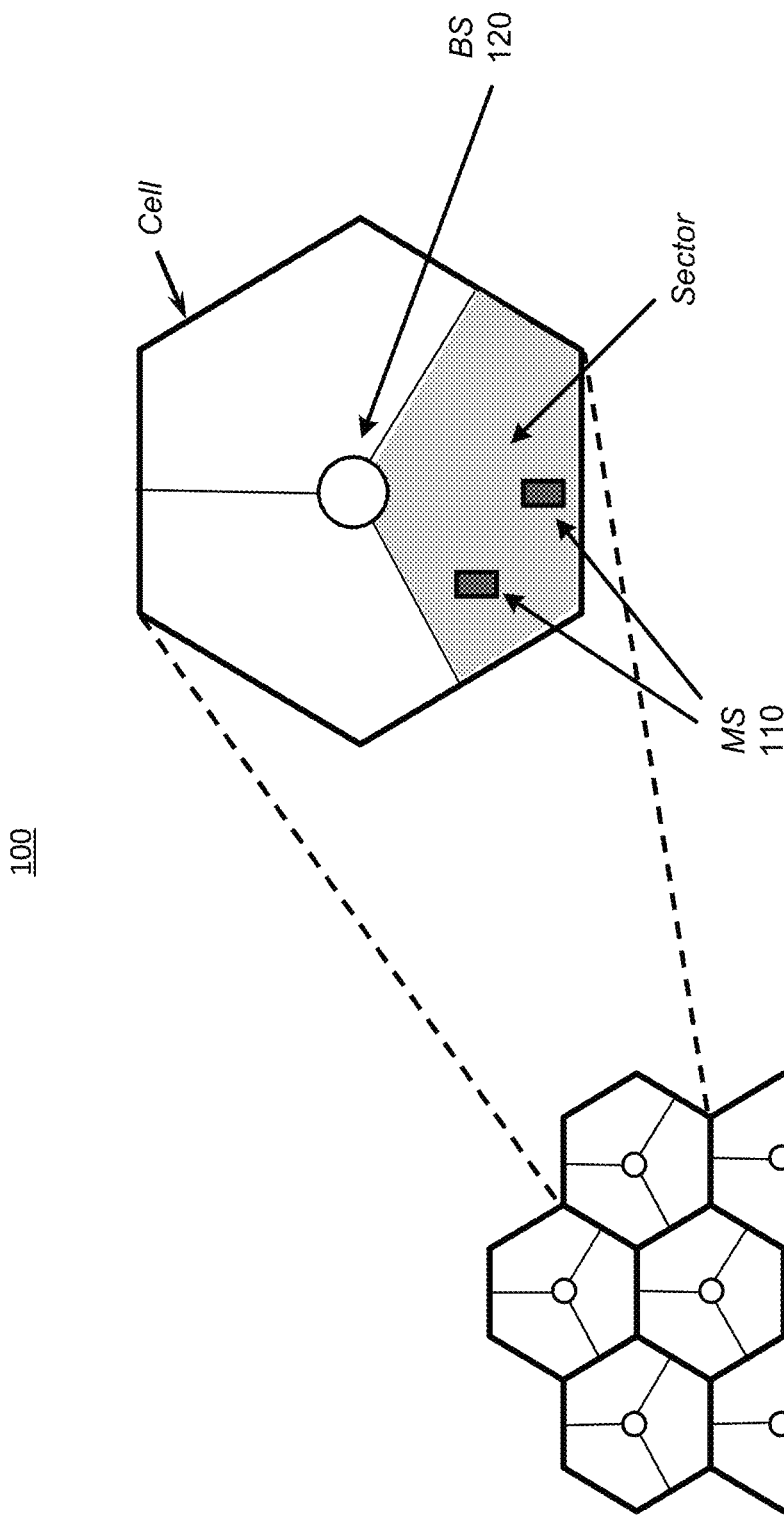
FIG. 1 illustrates the coverage of a wireless communication network that is comprised of a plurality of cells.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium or other memory readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

In the following description, a base station is used as an example of a transmitting device and a mobile station is used as an example of a receiving device for simplicity of illustration. It should be noted that the embodiments of this invention can also be applied to situations in which a mobile station is a transmitting device and a base station is a receiving device. Furthermore, the embodiments can also be applied to wireline communication. For r example, a cable headend may comprise a transmitting device and a set-top box or customer-premise-equipment (CPE) may comprise a receiving device, or vice versa.

In the following description, the word "subchannel" and "block" may be used interchangeably.

The multi-carrier system mentioned here can be of any format such as Orthogonal Frequency-Division Multiplexing (OFDM), Multi-Carrier Code Division Multiple Access (MC-CDMA), or single carrier-frequency multiplexing (SC-FDMA) possibly implemented in the format of discrete Fourier transform-spreading-OFDM (DFT-S-OFDM). The disclosed methods can also be applied to downlink, uplink, or both, where the duplexing technique is either Time Division Duplexing (TDD) or Frequency Division Duplexing (FDD), or where a scheme of simultaneous transmission and reception is used on the same channel. Without being explicitly expressed, the term "broadcast" also implies "multicast" throughout this text. Without loss of generality, Orthogonal Frequency-Division Multiple Access (OFDMA) is taken as an example to illustrate the present invention.

The following description provides specific details for a thorough understanding of the various embodiments and for the enablement of one skilled in the art. However, one skilled in the art will understand that the invention may be practiced without such details. In some instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number in this Detailed Description section also include the plural or singular number respectively. Additionally, the words "herein," "above," "below", and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Cellular Wireless Networks

In a cellular wireless network, the geographical region to be serviced by the network is normally divided into smaller areas called cells. In each cell the coverage is provided by a base station (BS). Thus, this type of structure is normally referred to as the cellular structure 100, as shown in FIG. 1. Within each coverage area, there are located mobile stations (MS's) 110 to be used as an interface between the users and the network. A BS 120 is connected to the backbone of the network, usually by a dedicated link. A base station also serves as a focal point to distribute information to and collect information from its mobile stations by radio signals. If a cell can also be divided in to sectors, from a system engineering point of view each sector can be considered a cell. In this context, the terms "cell" and "sector" are interchangeable.

Multi-Carrier Signal Format

Figure 2:
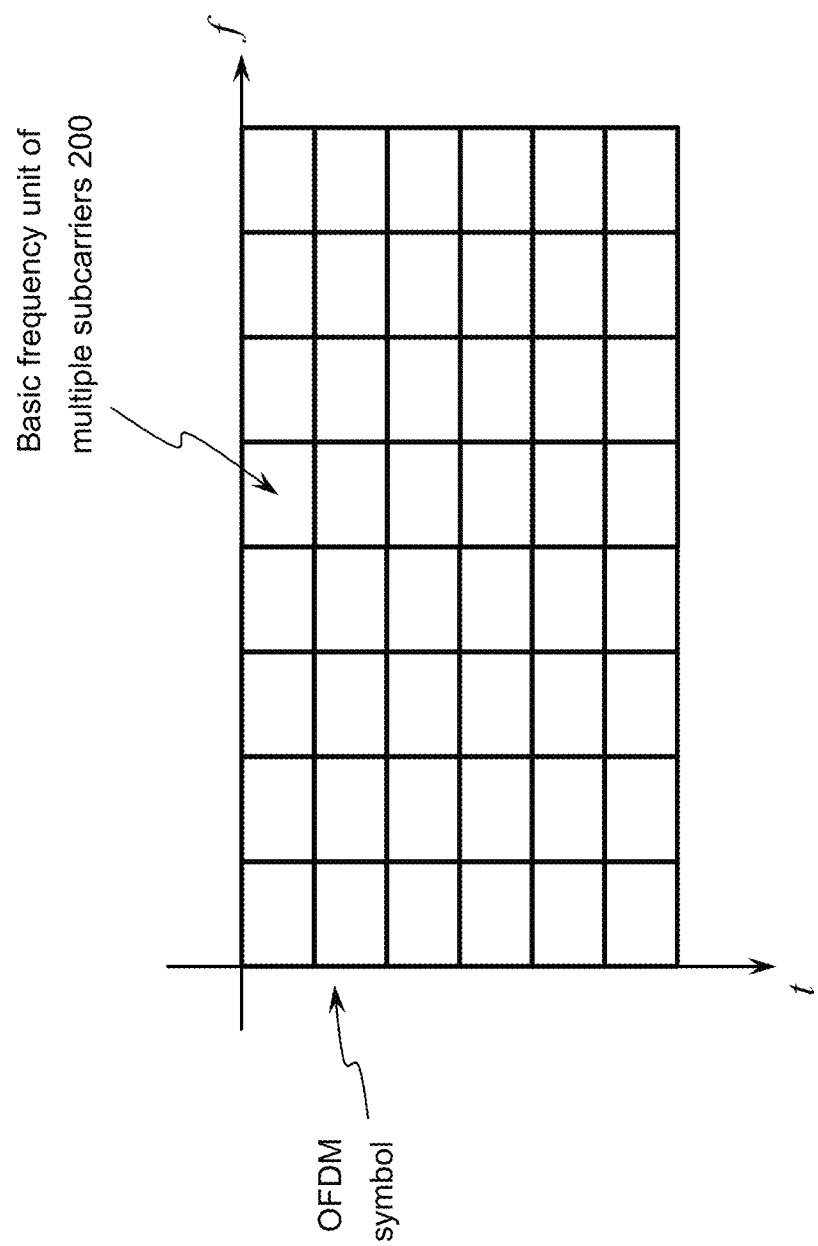
FIG. 2 is a graphical depiction of time and frequency resource of a multi-carrier system.

The physical media resource (e.g., radio or cable) in a multi-carrier communication system can be divided in both the frequency and time domains. This division provides high flexibility and fine granularity for resource sharing. The resource division in both the frequency and time domains is depicted in FIG. 2. A basic frequency unit (BFU) 200 consists of one or multiple contiguous or noncontiguous subcarriers.

The basic unit of a multi-carrier signal in the time domain is generally an OFDM symbol. The OFDM time domain waveform is generated by applying the inverse-fast-Fourier-transform (IFFT) to the OFDM signals in the frequency domain. A copy of the last portion of the time waveform, known as the cyclic prefix (CP), is inserted in the beginning of the waveform itself to form the OFDM symbol. The length of the CP of the OFDM symbols can be varied to meet the requirements of different applications such as various cell sizes or configurations.

The basic structure of a multi-carrier signal in the frequency domain is made up of subcarriers. A particular spectral band or channel is divided into a plurality of subcarriers. There are three types of subcarriers:
1. Data subcarriers, which carries information data;
2. Pilot subcarriers, whose phases and amplitudes are predetermined and made known to all receivers and which are used for assisting system functions such as estimation of system parameters; and
3. Silent subcarriers, which have no energy and are used for guard bands and direct current (DC) carrier.

The data subcarriers can be arranged, in a particular manner, into groups to support scalability and multiple-access. The subcarriers forming one group are not necessarily adjacent to each other. A subchannel is formed by a group of subcarriers over one or more OFDM symbols.

Transmission Frame Structure

Figure 3:
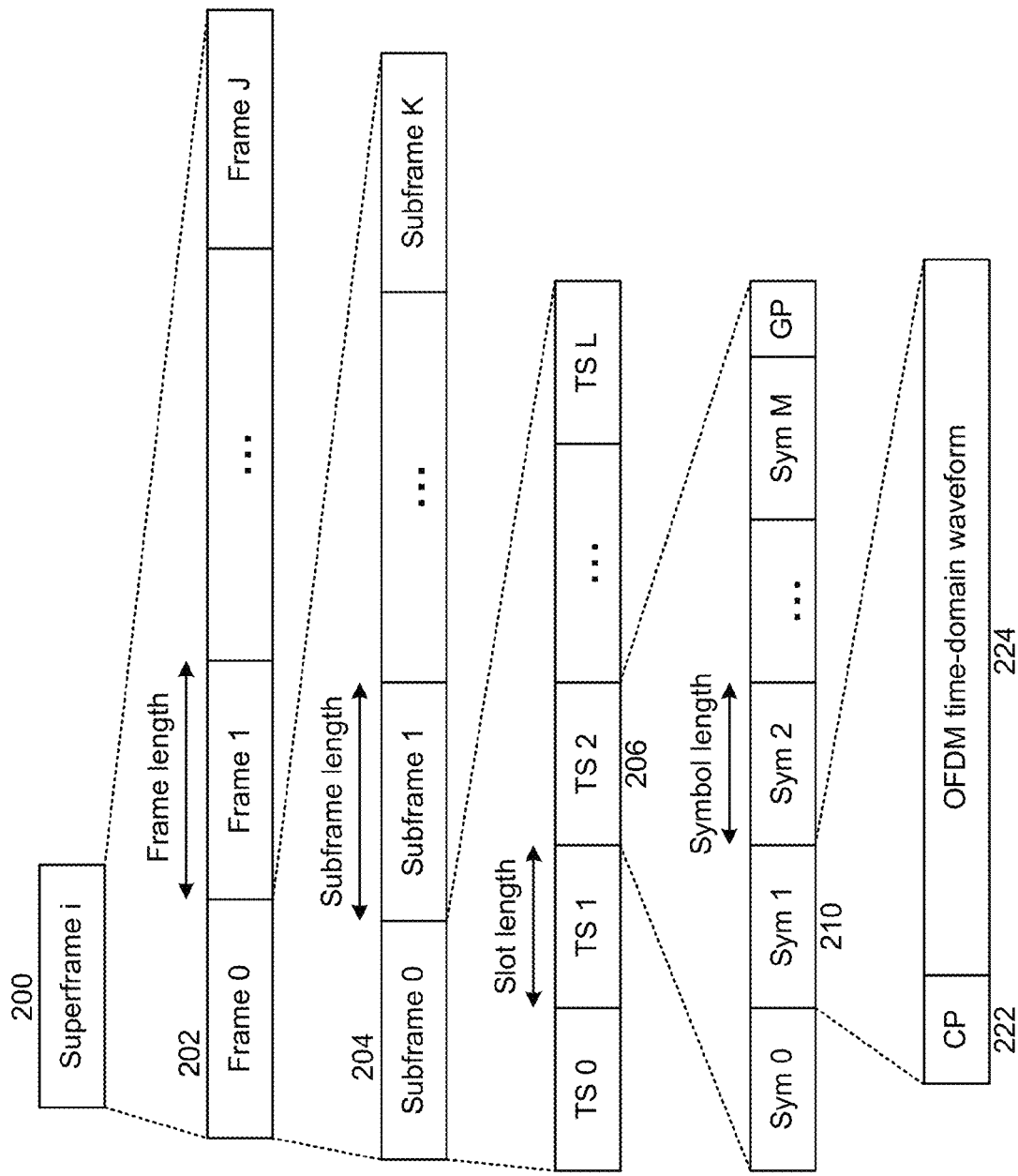
FIG. 3 is a graphical depiction of a multi-carrier signal structure in the time domain.
Figure 4:
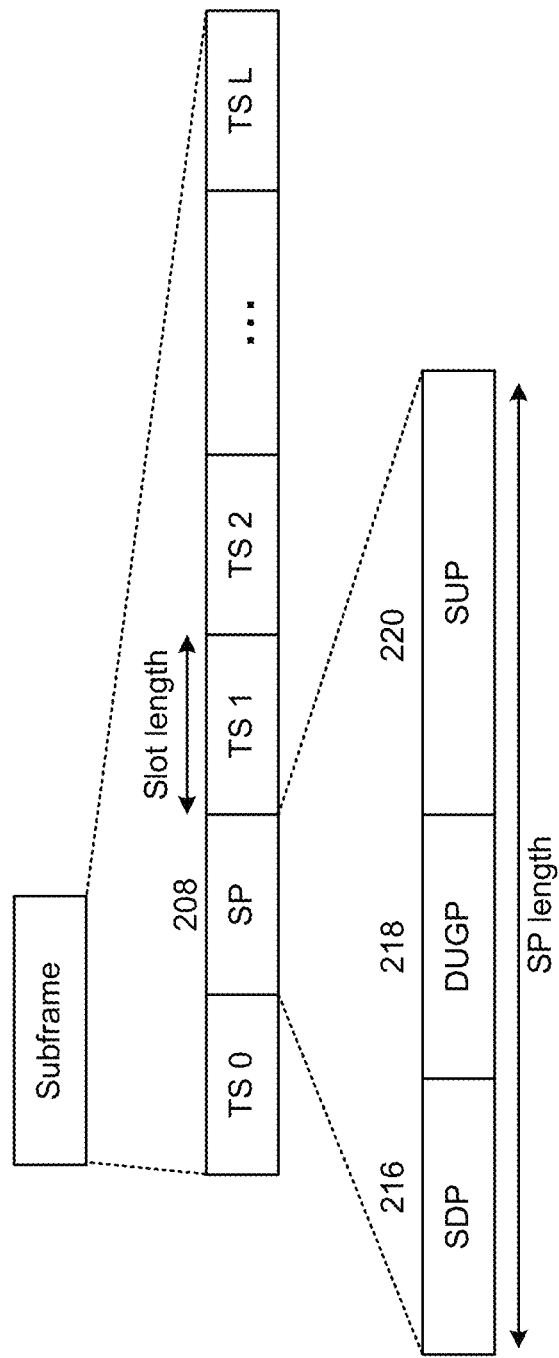
FIG. 4 is a graphical depiction of a subframe structure with a special period.

In accordance with the principles of the present invention, signal transmission may be carried out using the hierarchical frame structure shown in FIG. 3. In one embodiment, the top-level transmission unit may be a superframe 200 which may comprise multiple frames 202. Each frame 202 may in turn comprise multiple subframes and a subframe may be further divided into a plurality of time-slots (TS's) 206. Each TS 206 may comprise multiple OFDM symbols 210. In the TDD case, a TS 206 can be allocated for the use of either downlink (DL) transmission (including unicast, multicast, and broadcast) or uplink (UL) transmission. Within a frame 202 or subframe 204, a special period (SP) 208 is usually placed in the transition from DL transmission to UL transmission, as shown in FIG. 4. The SP 208 may consist of a special downlink period (SDP) 216, a downlink-to-uplink guard period (DUGP) 218, and a special uplink period (SUP) 220. In some embodiments, a small guard period may be appended to the end of each TS.

Hierarchical Resource Allocation

Figure 5:
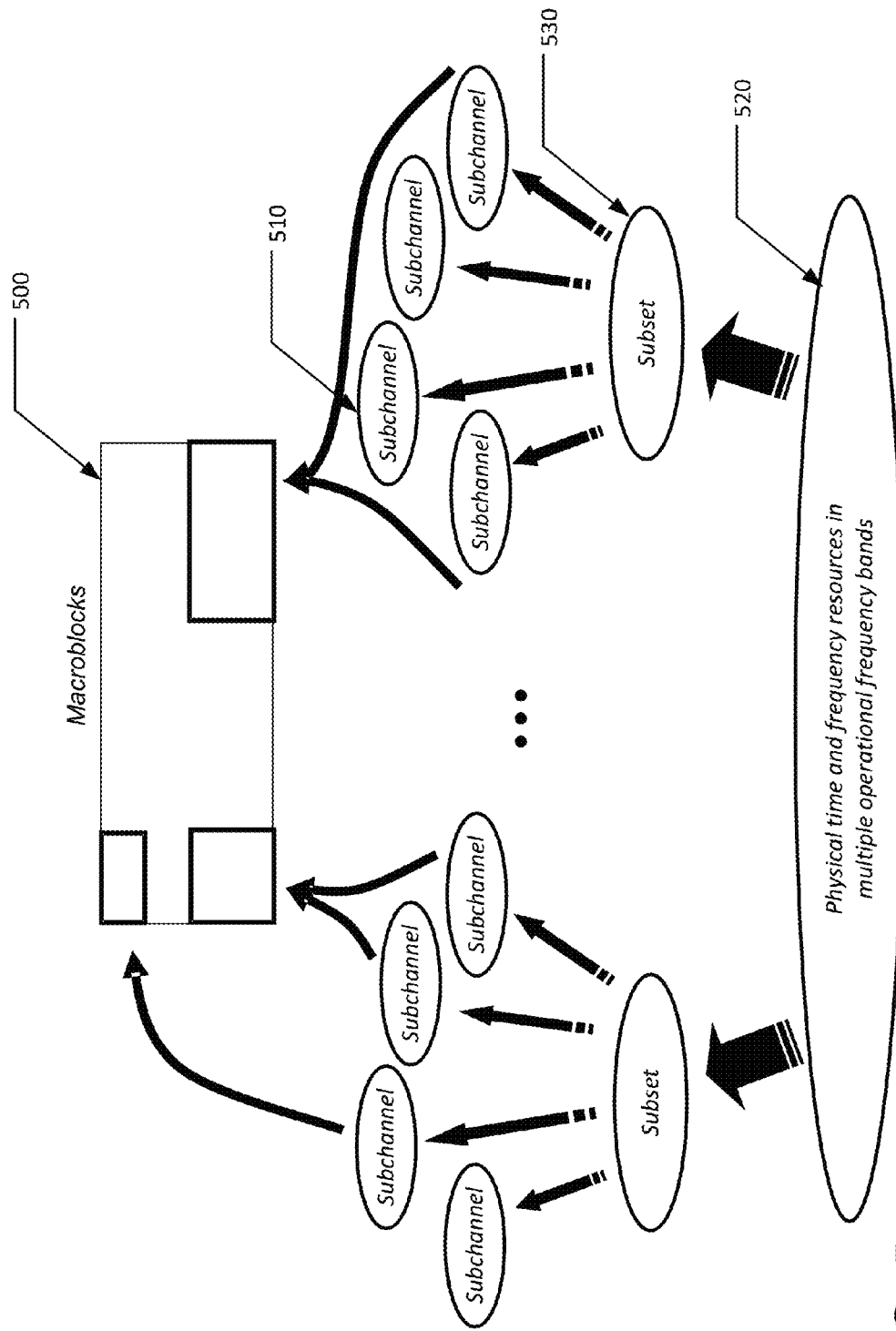
FIG. 5 is a graphical depiction of an embodiment of mapping physical time and frequency resources to macroblocks through subsets and subchannels.

In accordance with the principles of the present invention, time-frequency resources may be allocated, in macroblocks, for use by mobile stations. In some embodiments, a MS may be assigned one or more macroblocks for UL or DL communications. In an embodiment, a macroblock 500 may comprise of a plurality of subchannels 510 and a subchannel may be the smallest resource allocation unit, which may comprise a plurality of contiguous or noncontiguous subcarriers (and hence, a subcarrier is also referred to as a resource element) chosen from a subset of physical time and frequency resources 520, as shown in FIG. 5. For example, a subset 530 may contain a group of subcarriers in a plurality of OFDM symbols in one or multiple operational frequency bands. Operation frequency bands may be adjacent or non-adjacent to each other. The formation of subsets provides a means for controlling some system operational parameters and capabilities such as frequency reuse, radio channel frequency diversity, and beamforming facility. Subchannel formation can control radio channel diversity. The mapping of subchannels from a subset can provide finer control of these parameters and capabilities. Selective allocation of subchannels can further be used to improve performance. Subset and subchannel formation can vary from slot to slot and from downlink slots to uplink slots.

In an embodiment, the same hierarchical structure for the macroblocks, subchannels, subsets, and subcarriers may be used for both DL and UL. In another embodiment, different structures may be used for DL and UL. For example, the sizes of the macroblocks, subchannels, and subsets may be different for DL and UL if different frequency resources are available for DL and DL transmission. The sizes of the macroblocks, subchannels, and subsets may be chosen to utilize the available frequency resources in a most efficient way. For example, the total number of usable subcarriers in the available frequency resources may be divisible by the total number of subsets to be constructed. In some cases, the macroblocks and subchannels may have the same sizes for DL and UL and only the subsets may have a different size for DL and UL.

Figure 14:
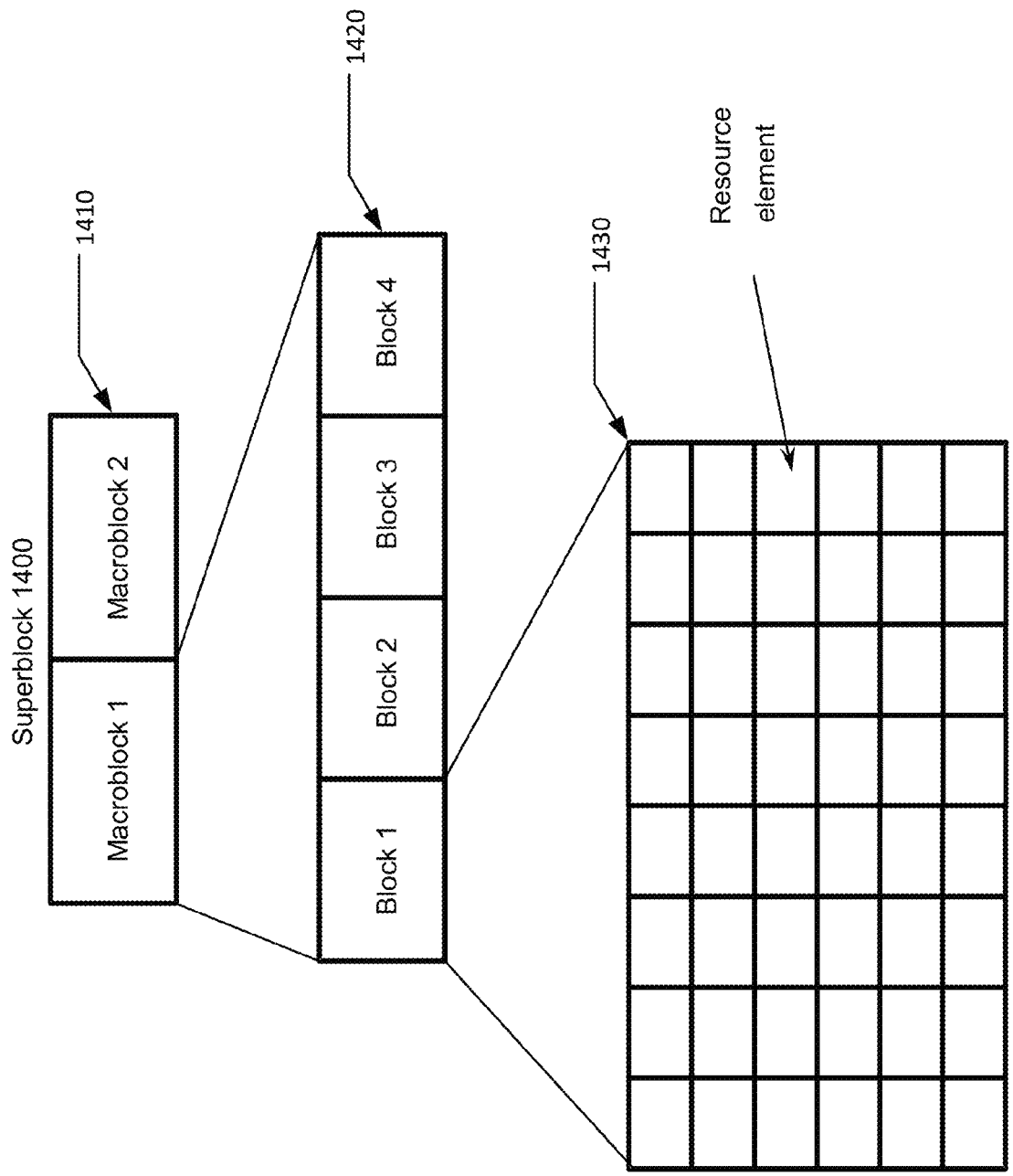
FIG. 14 is a graphical depiction of an example of hierarchical organization of radio resources.

In an embodiment, a plurality of macroblocks may be further organized into a superblock. For example, as shown in FIG. 14, a superblock 1400 may contain two macroblocks 1410, each of which contains four blocks 1420, each of which in turn contains 6×8 resource elements 1430. Additionally and optionally, the superblock may contain a plurality of macroblocks located in different radio frequency channels of the multi-carrier communication system.

Subset

In accordance with other embodiments of this invention, a subset may comprise a plurality of subcarriers over a time slot and the selection of subcarriers into a subset may be based on a set of static and/or dynamic rules associated with design criteria and signal characteristics. For example, 1. A first subset may be formed substantially for the construction of control subchannels while a second subset may be formed substantially for the construction of data subchannels;
2. A third subset may be formed substantially for the construction of broadcast/multicast subchannels while a fourth subset may be formed substantially for the construction of unicast subchannels;
3. A fifth subset may be formed substantially for the construction of subchannels to be used with a relatively large frequency-reuse factor while a sixth subset may be formed substantially for the construction of subchannels to be used with a relatively small frequency-reuse factor; or
4. A seventh subset may be formed substantially for the construction of subchannels to be used with a relatively wide transmission or reception antenna beam while a eighth subset may be formed substantially for the construction of subchannels to be used with a relatively narrow transmission or reception antenna beam.

In some embodiments, subsets may have different physical attributes, such as the size (number of subcarriers) and the power level of the subcarriers. For example, the subsets for use by control subchannels (control subsets) may be larger than the subsets for use by data subchannels (data subsets). Furthermore, subset formation can vary from one time slot to the next. For example, in one time slot, only control subsets may be formed; in the next, only data subsets may be formed; and in another time slot, both control subsets and data subsets may be formed.

Figure 6:
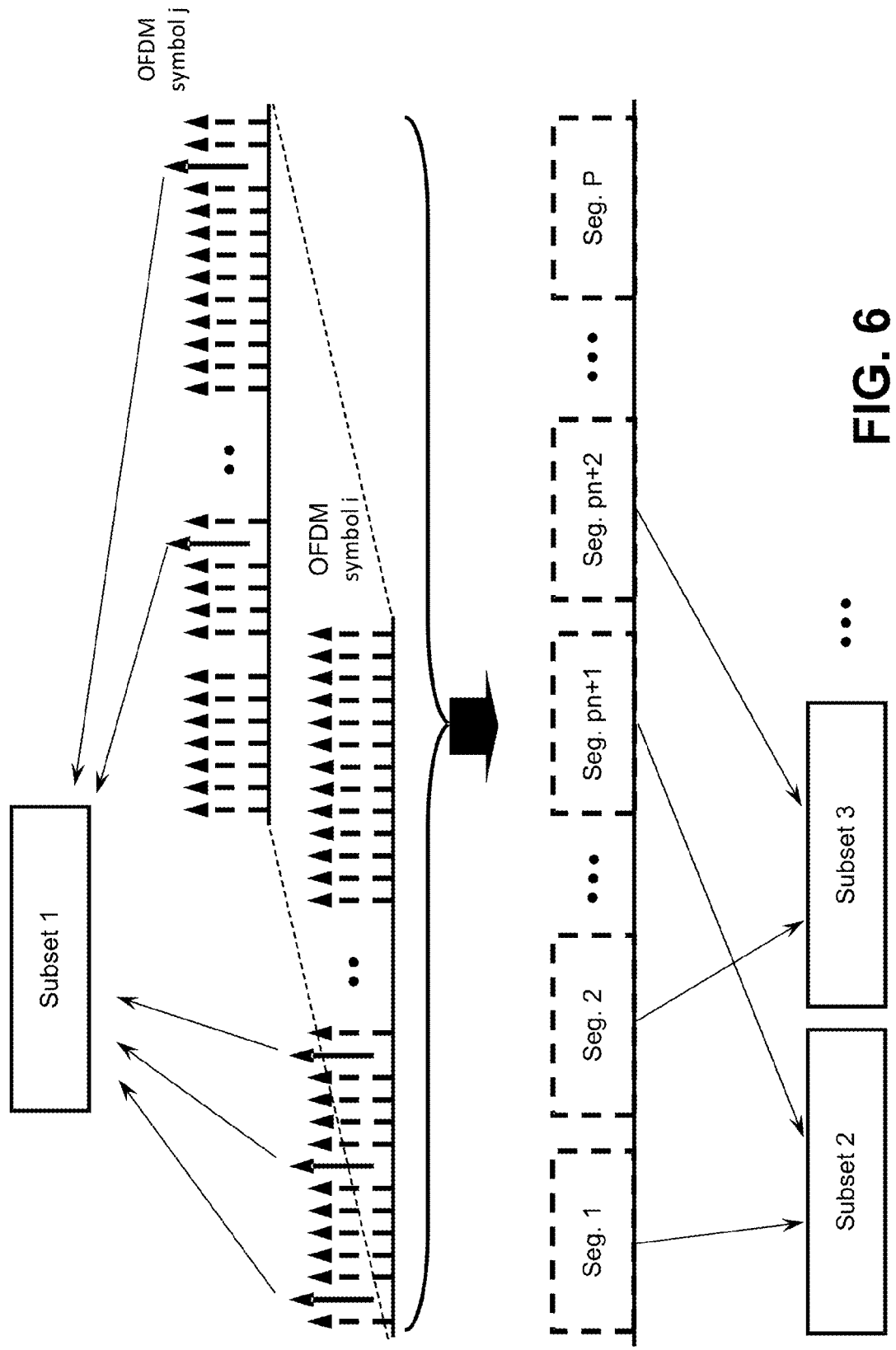
FIG. 6 is a graphical depiction of an embodiment of mapping subcarriers to subsets.

In other embodiments, the physical aspects of a subset (e.g., the number of subcarriers and their locations) may be defined through a particular protocol which is understood by both the base stations and mobile stations. Such a protocol can be a set of static specifications. For example, there are total of M (e.g., 640) subcarriers available for forming subsets. A control subset consists of N (e.g., 64) subcarriers that are predefined in positions distributed across the channel bandwidth. The rest of the M-N (e.g., 576) subcarriers are grouped into P (e.g., 36) segments, each of which consists of Q (e.g., 16) essentially contiguous subcarriers. A data subset is formed by taking every pth (e.g., 9th) segments, where p is a positive integer, thereby forming p (e.g., 9) data subsets, as shown in FIG. 6. As a result, each data subset consists of P/p (e.g., 4) segments or QP/p (e.g., 64) subcarriers.

The protocol can be a set of semi-static specifications. For example, the subset specifications such as the definition indices and the corresponding composition (Table 1) are stored in the memory of an MS. A BS sends the subset definition index to instruct its MS's to use a particular definition for constructing a subset.

TABLE 1

Subset definition and composition

| Subset definition index | Subset composition |
|---|---|
| 0 | A predefined group (G0) of subcarriers distributed across the channel, where G0 ⊄ G1 and G0 ⊄ G2 |

TABLE 1-continued

Subset definition and composition

| Subset definition index | Subset composition |
|---|---|
| 1 | A predefined group (G1) of subcarriers distributed across the channel, where G1 ⊄ G0 and G1 ⊄ G2 |
| 2 | A predefined group (G2) of subcarriers distributed across the channel, where G2 ⊄ G0 and G2 ⊄ G1 |
| 4 | Subset n = Segments (9m + n) Where n = 1, 2, 3 and m = 0, 1, 2, 3 |
| 5 | Subset n = Segments (9m + n) Where n = 4, 5, 6 and m = 0, 1, 2, 3 |
| 6 | Subset n = Segments (9m + n) Where n = 7, 8, 9 and m = 0, 1, 2, 3 |

The protocol can be a set of dynamic specifications, which may change from one time to the next (e.g., form one frame to the next). Such dynamic specifications may include sizes of the subsets and their corresponding subcarriers or segments.

In some embodiments, subset formation may be substantially different for neighboring cells. For example, the subsets formed in different neighboring cells, even if they are for the same purpose, may have different physical attributes, such as size and power level.

Figure 7:
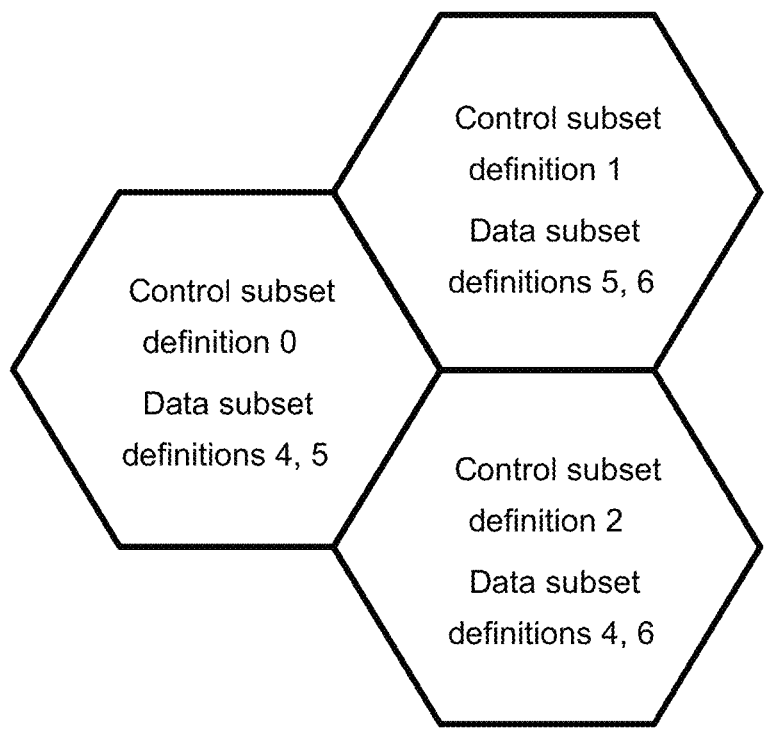
FIG. 7 is a graphical depiction of subsets being used in adjacent cells.

In other embodiments, subsets may use different frequency-reuse factors. A subset may be allocated in one cell and not used in another cell, while other subsets may be used for multiple cells. For example, neighboring cells may use different subset definitions (0, 1, 2 in Table 1) for control subsets to achieve a certain level of frequency reuse when transmitting control information. Neighboring cells may use the same or different subset definitions (4, 5, and 6 in Table 1) for data subsets to achieve a fractional frequency reuse when transmitting data, as shown in FIG. 7.

In further embodiments, in determining the subset specifications, a processor may take inputs of parameters such as the identification of the serving cell, the inter-cell and inter-sector frequency reuse factor, and other signals derived from parameters passed down from upper control layers.

Subchannel

In accordance with other embodiments of this invention, a subchannel may be constructed with a plurality of subcarriers within a particular subset and the mapping of such subcarriers within the subset to the subchannel may be based on a set of static and/or dynamic rules associated with design criteria and signal characteristics. For example, 1. Subchannel A is constructed substantially for the transmission of control signals while Subchannel B is constructed substantially for the transmission of data signals;
2. Subchannel C is constructed substantially for the transmission of broadcast/multicast signals while Subchannel D is constructed substantially for the transmission of unicast signals;
3. Subchannel E is constructed substantially to be used with a relatively large frequency-reuse factor while Subchannel F is constructed substantially be used with a relatively small frequency-reuse factor; or
4. Subchannel G is constructed substantially to be used with a relatively wide transmission or reception antenna beam while Subchannel H is constructed substantially to be used with a relatively narrow transmission or reception antenna beam.

In an embodiment, the size (the number of the subcarriers) of the subchannels may be fixed and the size of a subset may be an integer multiple of the size of a subchannel.

Figure 8:
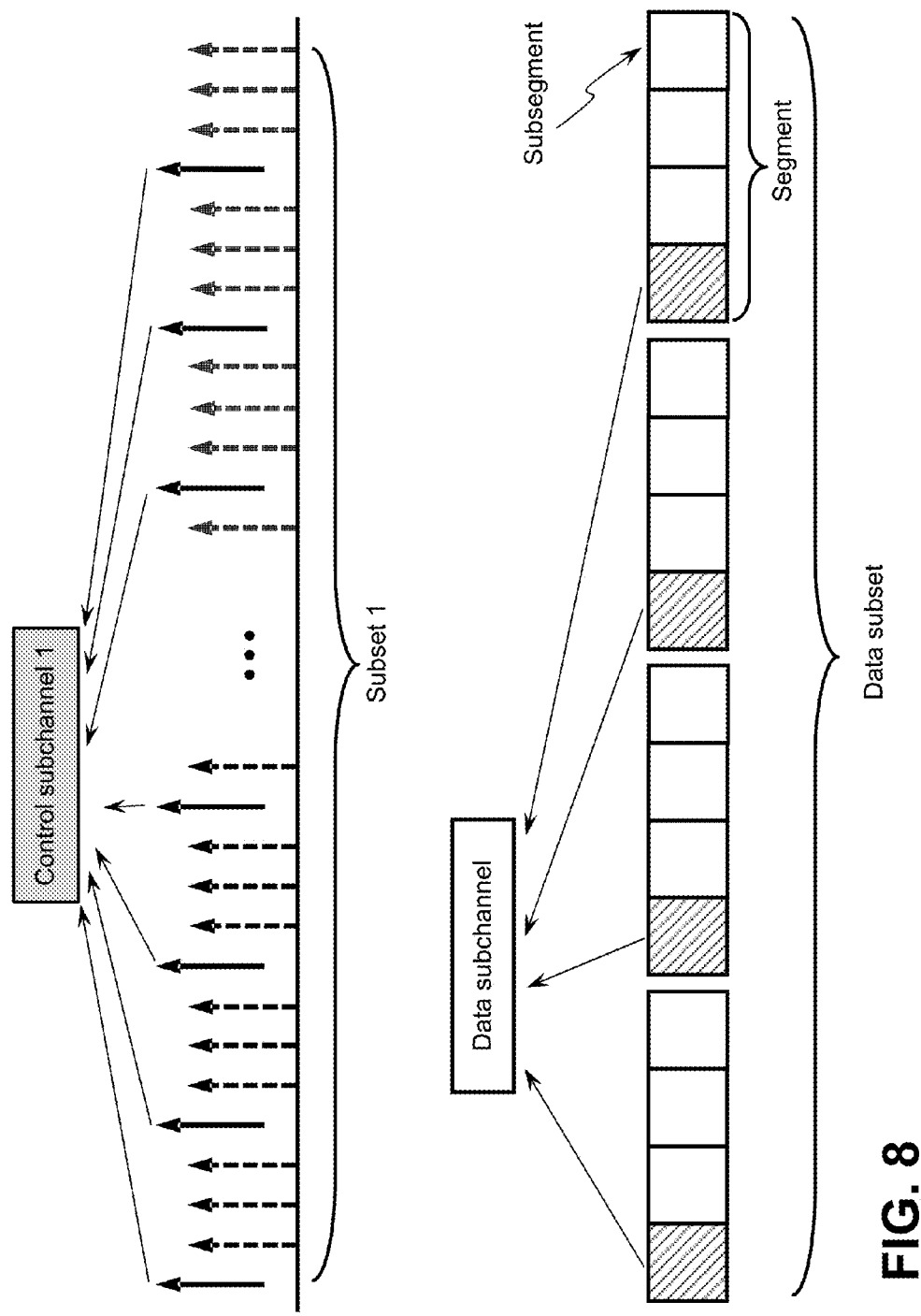
FIG. 8 is a graphical depiction of an embodiment of mapping of subcarriers from a subset to a subchannel.

In some embodiments, the mapping of subcarriers from a subset to a subchannel (i.e., subchannel formation) may be defined through a particular protocol which is understood by both the base stations and mobile stations. Such a protocol can be a set of static specifications. For example, referring to the above example, a control subchannel is formed by grouping every qth subcarriers in a control subset, where q is a positive integer. In addition, each segment in a data subset is divided into four subsegments. A data subchannel is formed by concatenating the first subsegments of all the segments in a data subset; another data subchannel is formed by concatenating the second subsegments of all the segments; and so on, as shown in FIG. 8.

The protocol can be a set of semi-static specifications. For example, the subchannel mapping specifications (Table 2) may be stored in the memory of an MS. A BS may send the mapping index to instruct its MS's to use a particular subchannel formation.

TABLE 2

Subchannel mapping specifications

| Mapping index | Subchannel formation |
|---|---|
| 0 | Every $4^{th}$ subcarriers in a subset |
| 1 | Every $4^{th}$ pairs of subcarriers in a subset |
| 2 | Every $4^{th}$ subsegments in a subset |
| ... | ... |

The protocol can be a set of dynamic mapping specifications, which may change from one time to the next (e.g., form one frame to the next).

In other embodiments, subchannel formation can vary from one time slot to the next. For example, in one time slot, the subchannel formation may be based on one particular mapping rule (say Mapping index 0) applied to a particular subset (say control subset) and in another time slot, the subchannel formation may be based on another particular mapping rule (say Mapping index 2) applied to a particular subset (data subset).

Figure 9:
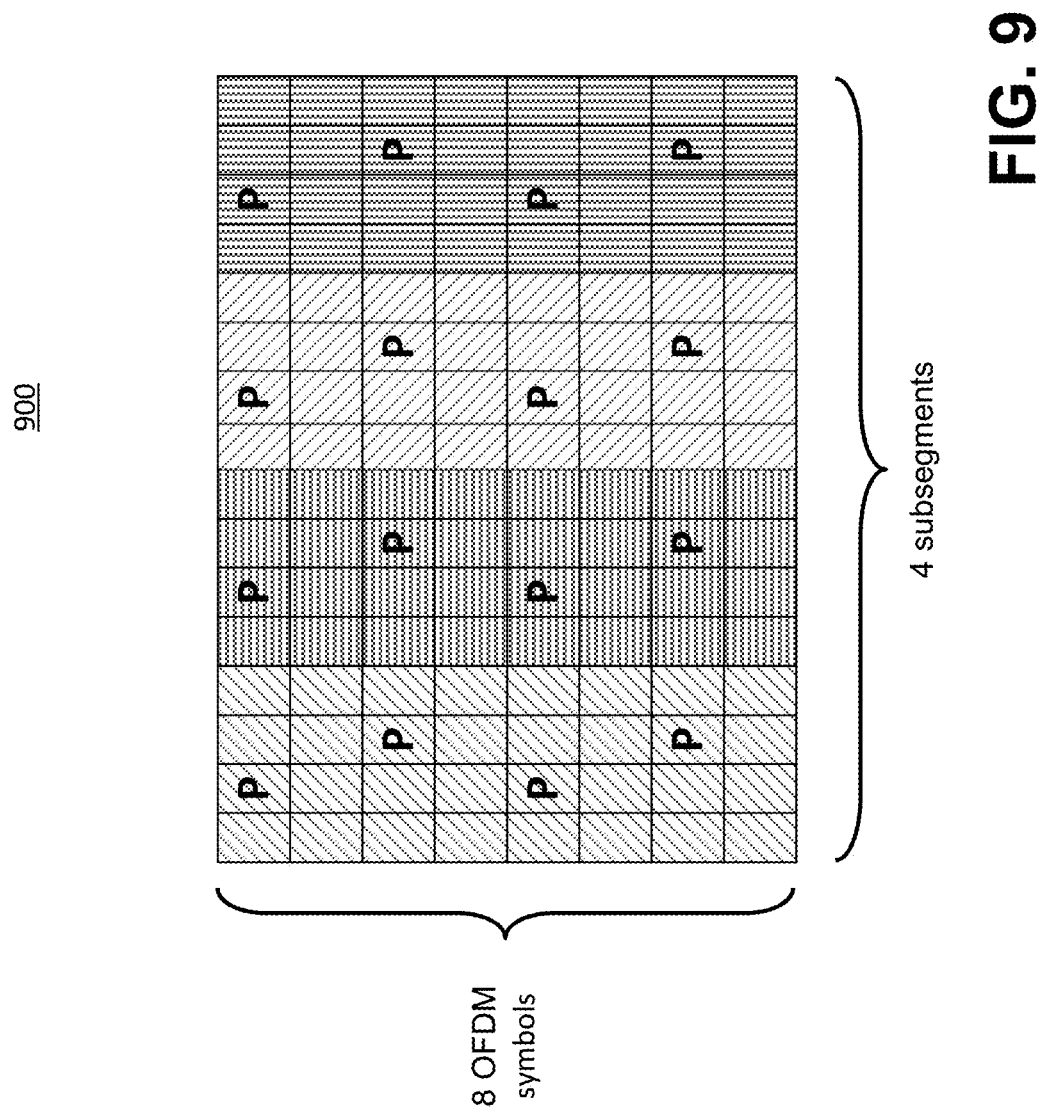
FIG. 9 is a graphical depiction of a subchannel example.

In other embodiments, some of the subcarriers in a subchannel may be used as pilots and their positions, phases, and/or amplitudes (pilot pattern) may be different, depending on the subchannel formation. The general rule is that the time distance between pilots should be less than the channel coherence time or their spectral distance should be less than the channel coherence bandwidth. For example, in the subchannel 900 shown in FIG. 9, which is a block of 8 OFDM symbols and 4 subsegments, four subcarriers are designated as pilots in each subsegment in every other OFDM symbols, resulting in a total of 16 pilots out of total 128 subcarriers in the subchannel.

Macroblock

Figure 10:
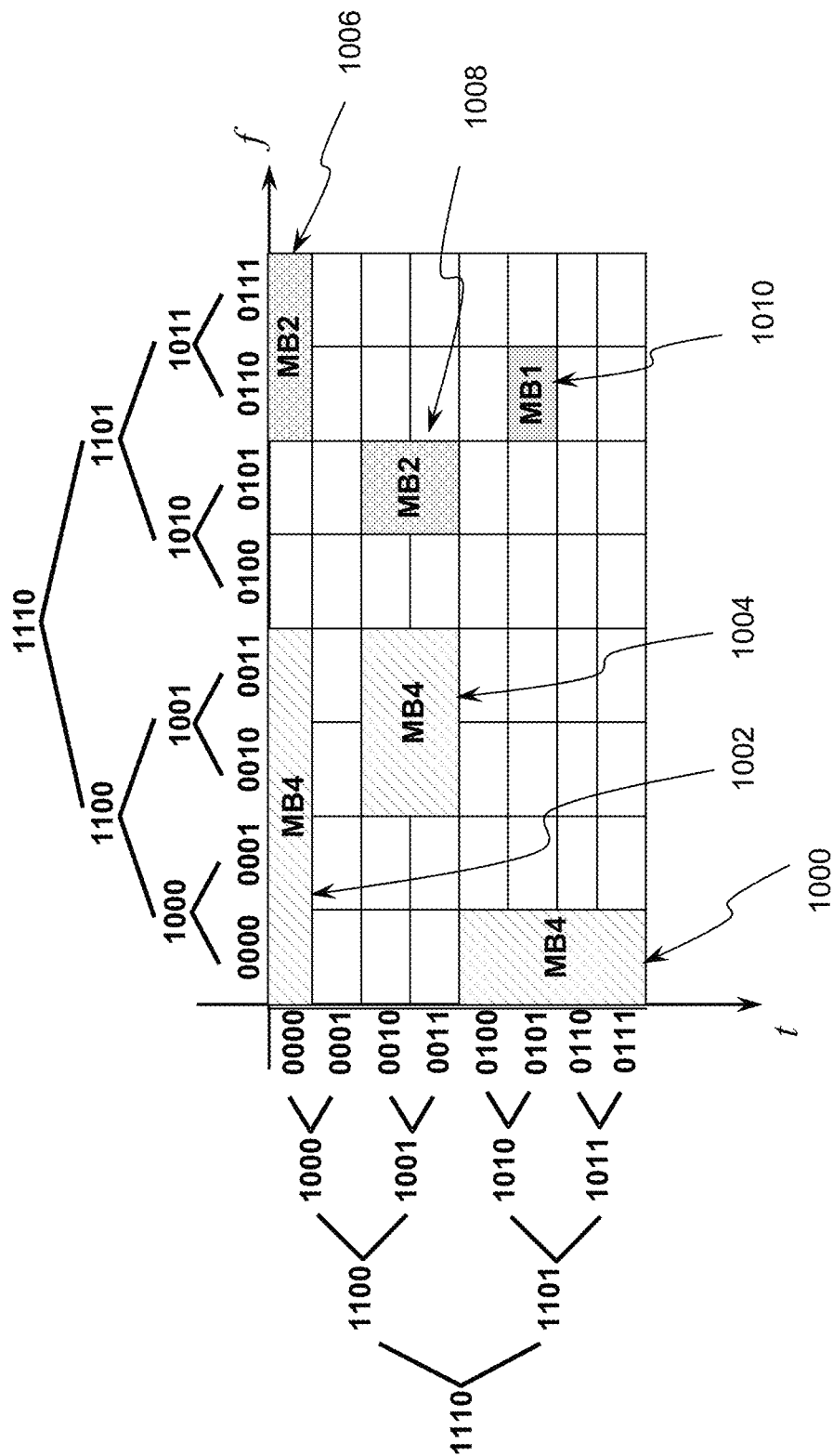
FIG. 10 is a graphical depiction of macroblocks and a tree-structure for identifying macroblocks.

In accordance with other embodiments of this invention, resources may be organized into macroblocks for allocation, thereby reducing the overhead in control signaling and facilitating system functions such as channel estimation, modulation, and coding. A macroblock may be formed with one or more subchannels concatenated or scattered in time, in frequency, or both. In an embodiment, a macroblock may contain 2n subchannels, where n is a non-negative integer. The two-dimensional (time and frequency) composition of a macroblock is called a macroblock pattern. For example, macroblocks can be formed with different macroblock patterns (e.g., MB4 1000 1002 1004, MB2 1006 1008, or MB1 1010) as shown in FIG. 10. The macroblock patterns used in the communication may be understood by both the base stations and mobile stations a priori, either through static definition in communication protocols and/or dynamic definition with follow-up information broadcasting through the wireless network. The block composition of a macroblock may be from cell to cell.

In some embodiments, the two-dimensional macroblocks may be indexed in hierarchy, wherein each possible macroblock to be used in a system can be uniquely identified with a single index. Such a one-to-one association can reduce the overhead for resource allocation in that when a macroblock, which consists of multiple subchannels in most cases, is assigned to an MS, only the corresponding index is required instead of the indices for the individual subchannels in that macroblock. Such an association can be realized using a particular mapping technique such as a look-up table or tree structure stored in the memory of the MS's and BS's. For example, in the case of two-dimensional tree-structure indexing as shown in FIG. 10, a macroblock is uniquely identified by an 8-bit index, where the first four bits represents the tree in the frequency axis and the latter four bits represent the tree in the time axis. For instance, macroblock 1000 is identified by 00001101, whereas Macroblock 1004 is identified by 10011001. In some cases, the number of subchannels in the frequency domain or in the time domain is preferably 2n, where n is a non-negative integer.

In other embodiments, the allocation of macroblocks to the MS's may be specified in an entry (possibly the resource allocation entry) in a control channel. The macroblocks allocation to an MS may be the same for a number of consecutive frames. The allocation specification thus may include the duration of the allocation, such as the beginning frame and the ending frame, or the explicit indices of those frames that the allocation is applicable to.

In further embodiments, within a macroblock, a modulation and coding scheme (MCS) can be applied to an individual subchannel, subchannels concatenated in time, subchannels concatenated in frequency, or all the subchannels. Accordingly, the acknowledgment, channel quality indication (CQI) feedback, or the hybrid automatic repeat request (HARQ) can be carried out with respect to an individual subchannels, subchannels concatenated in time, subchannels concatenated in frequency, or all the subchannels within a macroblock.

When using the same MCS, data can be coded across subchannels or across macroblocks. The decision on coding across subchannels or across macroblocks is based on parameters such as MCS and the total information bits.

In some embodiments, the physical attributes of pilot subcarriers such as their number, locations, phase values, and amplitude values within a subchannel or subchannels can vary when they are grouped to form a macroblock. For example, in the case shown in FIG. 11, where two subchannels are concatenated in time to form a macroblock, the pilot pattern for the first subchannel (upper) remains the same while the pilot pattern for the second subchannel has changed; and the ratio of pilots to total subcarriers for the macroblock remains the same as that for the subchannel. In the case shown in FIG. 12, where two subchannels are concatenated in time to form a macroblock, not only has the pilot pattern for the second subchannel changed, but also the ratio of pilots to total subcarriers for the macroblock is different from that of the subchannel.

When forming a macroblock, the pilot pattern may be defined through a particular protocol which is understood by both the base stations and mobile stations. For example, the pilot pattern for a macroblock can be associated with the macroblock pattern and such an association can be implemented using a look-up table stored in the memory of the MS's and BS's.

Other Embodiments

In accordance with other embodiments of this invention, the subset formation and subchannel construction for DL and UL may be designed to have a predetermined correspondence such that the channel information derived from a UL subchannel can be used for DL transmission with adaptive techniques (e.g., beamforming, channel allocation, or adaptive modulation & coding).

Figure 13:
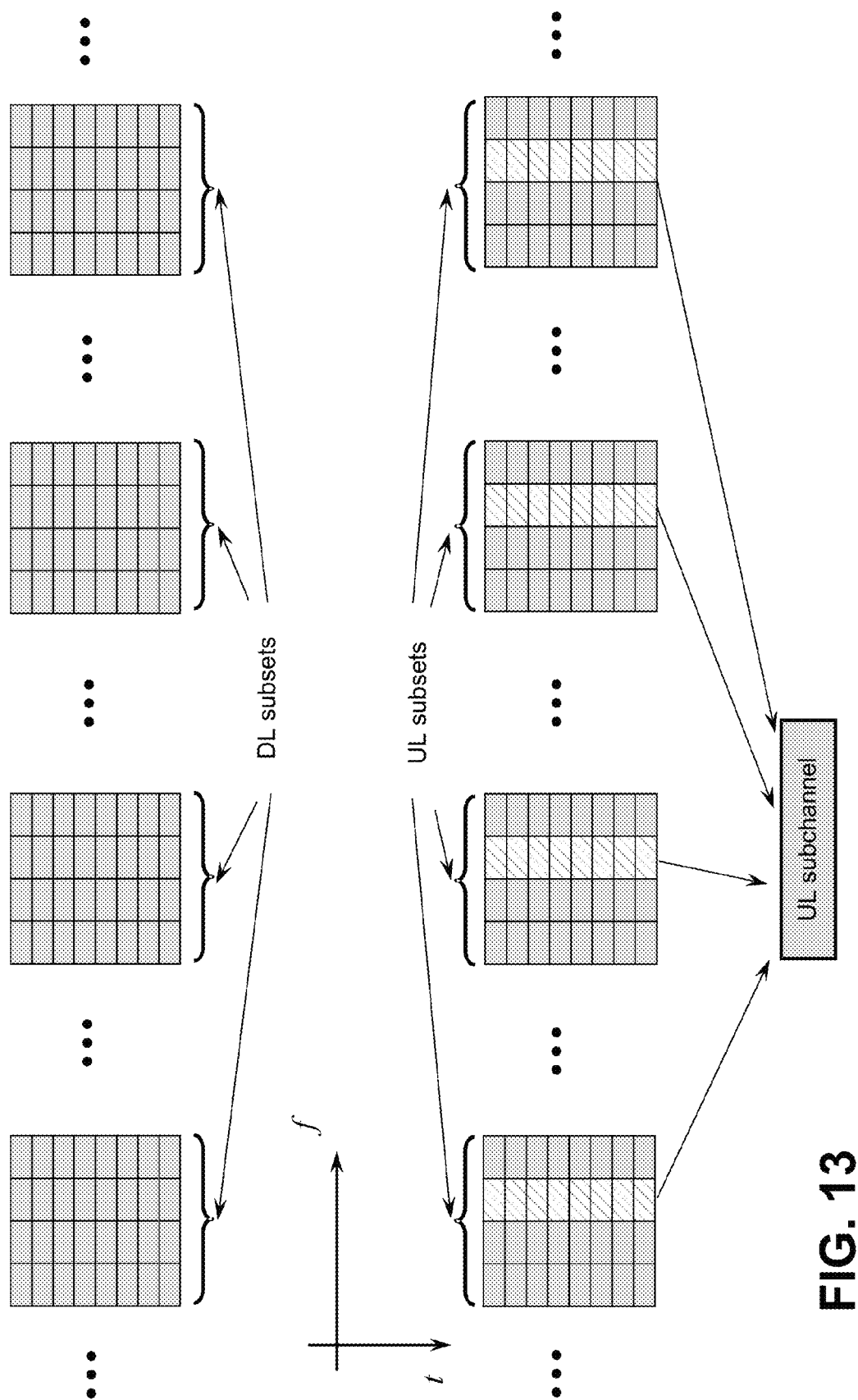
FIG. 13 is a graphical depiction of constructing DL subchannels from DL subsets corresponding to UL subsets used for constructing UL subchannels for a MS.

In some embodiments, a UL subchannel constructed from a UL subset may be used by a MS for UL transmission and one or more DL subchannels that are constructed from the corresponding DL subsets may be used for DL transmission to that MS, as shown in FIG. 13. Channel information obtained from this UL subchannel can be used to derive DL beamforming weights for these DL subchannels as long as the coherence bandwidth requirement is met.

In accordance with other embodiments of this invention, in a frame or a plurality of frames, there may be at least one subchannel with known physical location and mapping method which can be derived by a mobile station from the serving cell identification and/or other parameters. The subchannel contains control information for subset and subchannel formation for other frames/slots. Such control information is signaled to mobile stations and the mobile stations may use the information for decoding in other frames/slots.

In accordance with some embodiments, link adaptation can be carried out on an individual subchannel, subchannels concatenated in time, subchannels concatenated in frequency, or all the subchannels within a macroblock. For example, transmission power control (TPC), adaptive modulation and coding (AMC), or TPC and AMC can be applied on a subchannel basis or a macroblock basis. DL and UL interference information, sensitivity to interference, or transmission priority with respect to a an individual subchannel, subchannels concatenated in time, subchannels concatenated in frequency, or all the subchannels within a macroblock in a cell can be fed to another cell for consideration in TPC, AMC, or subchannel/macroblock scheduling or assignment.

In some embodiments, the MCS index table may contain an exhaustive list of possible combinations or patterns of the MCS for a plurality of blocks in a macroblock. Alternatively, the MCS index table may only store commonly used combinations or patterns of the MCS for a plurality of blocks in a macroblock.

In other embodiments, the bit length of a MCS index may be longer for more frequently occurring combinations of patterns of the MCS for the plurality of blocks in a macroblock (for example, Pattern 1-4 in Table 3). Additionally, the bit length of a MCS index may be smaller for less frequently occurring combinations of patterns of the MCS for the plurality of blocks in a macroblock (for example, Pattern 13 in Table 3).

TABLE 3

Examples of an MCS table

| MCS Index for Macroblock | | MCS pattern for Blocks in a Macroblock | | | |
|---|---|---|---|---|---|
| | | Block 1 | Block 2 | Block 3 | Block 4 |
| 1 | 000 | QPSK, Rate-½ Coding | QPSK, Rate-½ Coding | QPSK, Rate-½ Coding | QPSK, Rate-½ Coding |
| 2 | 001 | QPSK, Rate-¾ Coding | QPSK, Rate-¾ Coding | QPSK, Rate-¾ Coding | QPSK, Rate-¾ Coding |
| 3 | 010 | 16 QAM, Rate-½ Coding | 16 QAM, Rate-½ Coding | 16 QAM, Rate-½ Coding | 16 QAM, Rate-½ Coding |
| 4 | 011 | 16 QAM, Rate-¾ Coding | 16 QAM, Rate-¾ Coding | 16 QAM, Rate-¾ Coding | 16 QAM, Rate-¾ Coding |
| 5 | 1000 | QPSK, Rate-½ Coding | QPSK, Rate-½ Coding | QPSK, Rate-¾ Coding | QPSK, Rate-¾ Coding |
| 6 | 1001 | QPSK, Rate-¾ Coding | QPSK, Rate-¾ Coding | QPSK, Rate-½ Coding | QPSK, Rate-½ Coding |
| 7 | 1010 | 16 QAM, Rate-½ Coding | 16 QAM, Rate-½ Coding | 16 QAM, Rate-¾ Coding | 16 QAM, Rate-¾ Coding |
| 8 | 1011 | 16 QAM, Rate-¾ Coding | 16 QAM, Rate-¾ Coding | 16 QAM, Rate-½ Coding | 16 QAM, Rate-½ Coding |
| 9 | 11000 | QPSK, Rate-½ Coding | QPSK, Rate-½ Coding | 16 QAM, Rate-½ Coding | 16 QAM, Rate-½ Coding |
| 10 | 11001 | 16 QAM, Rate-½ Coding | 16 QAM, Rate-½ Coding | QPSK, Rate-½ Coding | QPSK, Rate-½ Coding |
| 11 | 11010 | QPSK, Rate-¾ Coding | QPSK, Rate-¾ Coding | 16 QAM, Rate-¾ Coding | 16 QAM, Rate-¾ Coding |
| 12 | 11011 | 16 QAM, Rate-¾ Coding | 16 QAM, Rate-¾ Coding | QPSK, Rate-¾ Coding | QPSK, Rate-¾ Coding |
| 13 | 111000 | QPSK, Rate-½ Coding | 16 QAM, Rate-¾ Coding | 16 QAM, Rate-¾ Coding | 16 QAM, Rate-¾ Coding |
| . . . | | | | | |

Figure 15:
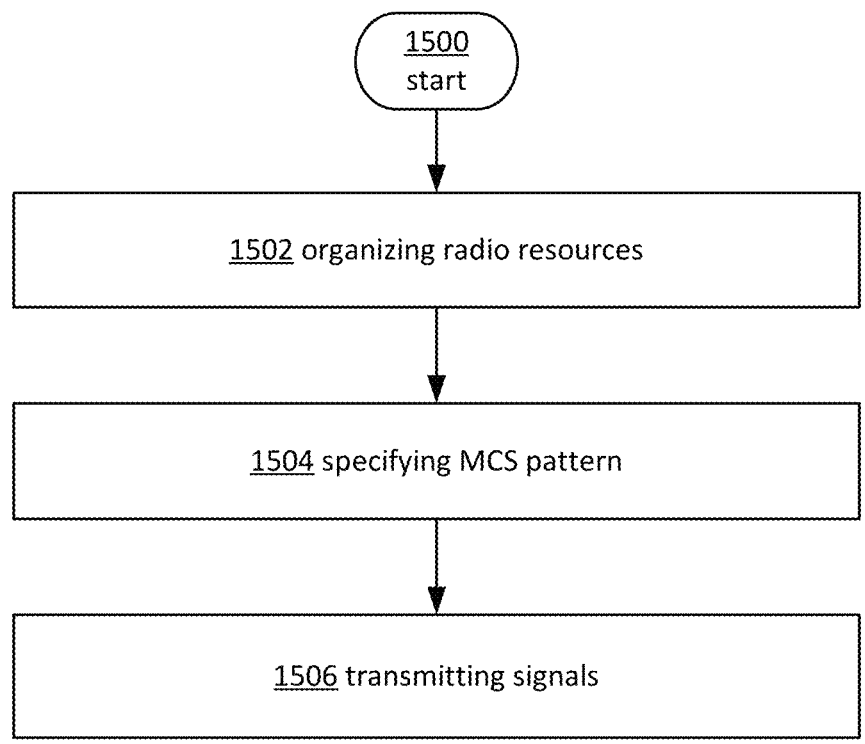
FIG. 15 illustrates an example of an operational procedure for practicing aspects of the present disclosure.

FIG. 15 depicts an exemplary operational procedure for communicating in a multi-carrier communication system including operations 1500, 1502, 1504, and 1506. In one embodiment, the procedure may be performed by a base station operating in the multi-carrier communication system.

Referring to FIG. 15, operation 1500 begins the operational procedure and operation 1502 illustrates organizing radio resources. In an embodiment, the radio resources are organized in at least three hierarchical levels. In one embodiment, the hierarchical levels may comprise macroblocks, blocks, and radio resource elements. A macroblock may contain a plurality of blocks and a block may contain a plurality of radio resource elements. The radio resource elements may further correspond to subcarriers in an orthogonal frequency division multiplexing (OFDM) symbol.

Operation 1504 illustrates specifying, with an index in a control message, a modulation and/or coding scheme (MCS) pattern indicting a MCS for each block within a macroblock. In an embodiment, a bit string may be used to represent a MCS index. In an embodiment, fewer bits are used by the index to specify a MCS pattern that is used statistically more frequently, and more bits are used by the index to specify a MCS pattern that is used statistically less frequently. In one embodiment, a control message may contain a sequence of indices indicating the MCS pattern for a sequence of macroblocks. The control message may further contain the total bit length of the sequence of indices or the bit length of an individual index. A checksum bit field may be attached to the end of the control message. The mobile station may use the aforementioned information for the detection of the MCS for each block in one or multiple macroblocks.

In one embodiment, a single index may be used to indicate MCS for multiple blocks in a macroblock. In another embodiment, multiple indices may be used to indicate the MCS for multiple blocks in a macroblock.

Operation 1504 illustrates transmitting signals over the plurality of macroblocks.

In some embodiments, a block composition of a macroblock may be preconfigured by the base station and indicated in a control message sent to a mobile station served by the base station. Different block compositions of a macroblock may be used for different channel or interference profiles. For example, different block compositions for macroblocks may be used for different frequency-reuse patterns or frequency-reuse factors among adjacent cells.

In one embodiment, a bit string may be used in a control message to indicate the block composition of a macroblock. The mapping between the bit string and the block composition of the macroblock may be known to a mobile station and a base station. The mapping may be pre-configured or configured in real-time.

In an embodiment, a macroblock may contain a plurality of blocks located in the same frequency channel of the multi-carrier communication system. In another embodiment, the macroblock may contain a plurality of blocks located in different radio frequency channels of the multi-carrier communication system.

In one embodiment, the macroblock may contain a plurality of blocks located in a radio frequency channel below 1 GHz and a plurality of blocks located in another radio frequency channel above 1.5 GHz.

In an embodiment, the MCS pattern may indicate QPSK modulation for each block in the macroblock or 16QAM modulation for each block in the macroblock. In another embodiment, the MCS pattern may indicate QPSK modulation for some blocks in the macroblock and 16QAM modulation for other blocks in the macroblock.

In an embodiment, more bits may be used to identify a physical or logical location of a block than to identify a physical or logical location of a macroblock.

In some embodiments, a plurality of macroblocks may be further organized into a superblock. Additionally and optionally, the superblock may contain a plurality of macroblocks located in different radio frequency channels of the multi-carrier communication system.

In an embodiment, data contained in each block in a macroblock may be encoded separately. In other embodiments, data contained in a plurality of blocks in a macroblock may be encoded together.

In one embodiment, an MCS index table may be stored in the base station, and each entry of the MCS index table may indicate mapping of a MCS index and a corresponding MCS pattern of a plurality of blocks in a macroblock.

Figure 16:
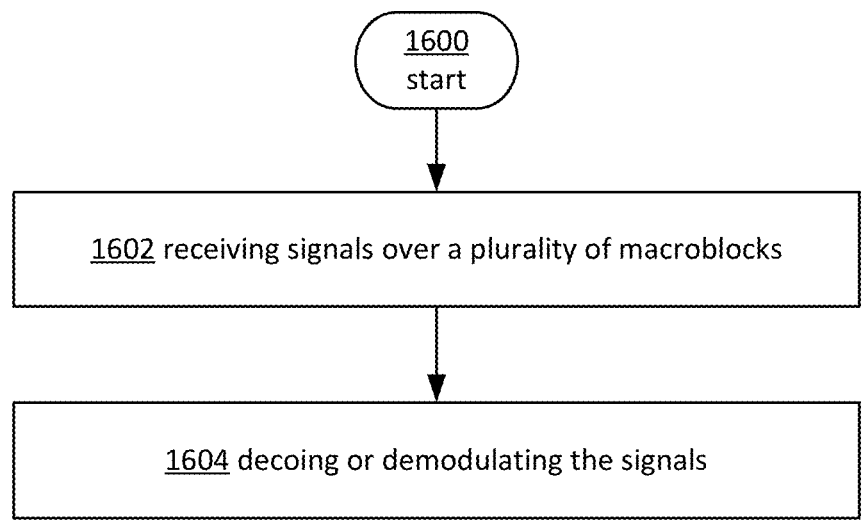
FIG. 16 illustrates an example of an operational procedure for practicing aspects of the present disclosure.

FIG. 16 depicts an exemplary operational procedure for communicating in a multi-carrier communication system including operations 1600, 1602, and 1604. In one embodiment, the procedure may be performed by a mobile station operating in the multi-carrier communication system.

Referring to FIG. 16, operation 1600 begins the operational procedure and operation 1602 illustrates receiving signals over a plurality of macroblocks. In an embodiment, the macroblocks may be indicative of radio frequency resources. The macroblocks may contain a plurality of blocks, and a block may contain a plurality of radio resource elements corresponding to a subcarrier in an orthogonal frequency division multiplexing (OFDM) symbol.

Operation 1604 illustrates decoding or demodulating the signals. In one embodiment, the signals may be decoded or demodulated according to an index in a control message. The index may further specify a modulation and/or coding scheme (MCS) pattern indicting a MCS for each block within the macroblock. In one embodiment, fewer bits may be used for the index to specify a MCS pattern that is used statistically more frequently, and more bits may be used for the index to indicate a MCS pattern that is used statistically less frequently. In an embodiment, block composition of a macroblock may be preconfigured and indicated in a control message. In one embodiment, a macroblock may contain a plurality of blocks located in the same frequency channel of the multi-carrier communication system. In another embodiment, the macroblock may contain a plurality of blocks located in different radio frequency channels of the multi-carrier communication system.

In an embodiment, a macroblock may contains a plurality of blocks located in a radio frequency channel below 1 GHz and a plurality of blocks located in another radio frequency channel above 1.5 GHz.

In an embodiment, the MCS pattern may indicate QPSK for each block in the macroblock or 16QAM modulation for each block in the macroblock. In another embodiment, the MCS pattern may indicate QPSK modulation for some blocks in the macroblock and 16QAM modulation for other blocks in the macroblock.

In an embodiment, more bits may be used to identify a physical or logical location of a block than to identify a physical or logical location of a macroblock.

In an embodiment, a plurality of macroblocks may be further organized into a superblock. Additionally and optionally, the superblock may contain a plurality of macroblocks located in different radio frequency channels of the communication system.

In an embodiment, data contained in each block in a macroblock may be encoded separately. In other embodiments, data contained in a plurality of blocks in a macroblock may be encoded together.

In an embodiment, an MCS index table may be stored in the mobile station. In some embodiments, each entry of the MCS index table may indicate mapping of an MCS index and a corresponding MCS pattern of a plurality of blocks in a macroblock.

Lastly, while the present disclosure has been described in connection with the preferred aspects, as illustrated in the various figures, it is understood that other similar aspects may be used or modifications and additions may be made to the described aspects for performing the same function of the present disclosure without deviating there from. For example, in various aspects of the disclosure, methods and systems for communicating in a wireless communications system were disclosed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method of communication by a base station in a multi-carrier communication system, the method comprising:
   organizing radio resources in at least three hierarchical levels comprising macroblock, block, and radio resource element, wherein a macroblock contains a plurality of blocks and a block contains a plurality of radio resource elements corresponding to subcarriers in an orthogonal frequency division multiplexing (OFDM) symbol;
   storing, by the base station, a modulation and/or coding scheme (MCS) index table, the table containing:
      a first entry of a single index indicating a MCS common to a plurality of blocks in a macroblock; and
      a second entry of a single index indicating a combination of different MCS's for a plurality of blocks in a macroblock; and
   transmitting a control message, wherein the control message includes an MCS index associated with the macroblock indicated by the first or second entry.

2. The method of claim 1, wherein a block composition of a macroblock is preconfigured by the base station and indicated in the control message.

3. The method of claim 1, wherein a macroblock contains a plurality of blocks located in a same radio frequency channel of the multi-carrier communication system.

4. The method of claim 1, wherein a macroblock contains a plurality of blocks located in different radio frequency channels of the multi-carrier communication system.

5. The method of claim 4, wherein a macroblock contains a plurality of blocks located in a radio frequency channel below 1 GHz and a plurality of blocks located in another radio frequency channel above 1.5 GHz.

6. The method of claim 1, wherein the MCS index included in the control message indicates QPSK modulation for each block in the macroblock or 16 QAM modulation for each block in the macroblock.

7. The method of claim 1, wherein the MCS index included in the control message indicates QPSK modulation for some blocks in the macroblock and 16 QAM modulation for other blocks in the macroblock.

8. The method of claim 1, wherein a plurality of macroblocks are further organized into a superblock.

9. The method of claim 8, wherein the superblock contains a plurality of macroblocks located in different radio frequency channels of the multi-carrier communication system.

10. The method of claim 1, wherein data contained in each block in a macroblock is encoded separately.

11. The method of claim 1, wherein data contained in a plurality of blocks in a macroblock is encoded together.

12. A method of communication by a mobile station in a multi-carrier communication system with radio resources being organized in at least three hierarchical levels comprising macroblock, block, and radio resource element, wherein a macroblock contains a plurality of blocks and a block contains a plurality of radio resource elements corresponding to subcarriers in one or more orthogonal frequency division multiplexing (OFDM) symbols, the method comprising:
storing, by the mobile station, a modulation and/or coding scheme (MCS) index table, the table containing:
a first entry of a single index indicating a MCS common to a plurality of blocks in a macroblock; and
a second entry of a single index indicating a combination of different MCS's for a plurality of blocks in a macroblock; and
receiving a control message containing an MCS index associated with the macroblock indicated by the first or second entry.

13. The method of claim 12, wherein a block composition of a macroblock is preconfigured and indicated in the control message.

14. The method of claim 12, wherein a macroblock contains a plurality of blocks located in a same radio frequency channel of the multi-carrier communication system.

15. The method of claim 12, wherein a macroblock contains a plurality of blocks located in different radio frequency channels of the multi-carrier communication system.

16. The method of claim 12, wherein the MCS index contained in the control message indicates QPSK for each block in the macroblock or 16 QAM modulation for each block in the macroblock.

17. The method of claim 12, wherein the MCS index contained in the control message indicates QPSK modulation for some blocks in the macroblock and 16 QAM modulation for other blocks in the macroblock.

18. A base station in a multi-carrier communication system, the base station comprising:
an apparatus configured to organize radio resources in at least three hierarchical levels comprising macroblock, block, and radio resource element, wherein a macroblock contains a plurality of blocks and a block contains a plurality of radio resource elements corresponding to subcarrier in one or more orthogonal frequency division multiplexing (OFDM) symbols;
an apparatus configured to store a modulation and/or coding scheme (MCS) index table, the table containing:
a first entry of a single index indicating a MCS common to a plurality of blocks in a macroblock; and
a second entry of a single index indicating a combination of different MCS's for a plurality of blocks in a macroblock; and
an apparatus configured to transmit a control message, wherein the control message includes an MCS index associated with the macroblock indicated by the first or second entry.

19. The base station of claim 18, wherein a macroblock contains a plurality of blocks located in a same radio frequency channel of the multi-carrier communication system.

20. The base station of claim 18, wherein a macroblock contains a plurality of blocks located in different radio frequency channels of the multi-carrier communication system.

21. A mobile station in a multi-carrier communication system with radio resources being organized in at least three hierarchical levels comprising macroblock, block, and radio resource element, wherein a macroblock contains a plurality of blocks and a block contains a plurality of radio resource elements corresponding to subcarriers in one or more orthogonal frequency division multiplexing (OFDM) symbols, the mobile station comprising:
an apparatus configured to store a modulation and/or coding scheme (MCS) index table, the table containing:
a first entry of a single index indicating a MCS common to a plurality of blocks in a macroblock; and
a second entry of a single index indicating a combination of different MCS's for a plurality of blocks in a macroblock; and
an apparatus configured to receive a control message containing an MCS index associated with the macroblock indicated by the first or second entry.

22. The mobile station of claim 21, wherein a macroblock contains a plurality of blocks located in a same radio frequency channel of the multi-carrier communication system.

23. The mobile station of claim 21, wherein a macroblock contains a plurality of blocks located in different radio frequency channels of the multi-carrier communication system.

* * * * *